United States Patent
Ono et al.

(10) Patent No.: US 12,407,279 B2
(45) Date of Patent: Sep. 2, 2025

(54) MOTOR CONTROL DEVICE, MOTOR CONTROL METHOD, AND PROGRAM

(71) Applicant: OMRON Corporation, Kyoto (JP)

(72) Inventors: Yasushi Ono, Kyoto (JP); Kotaro Asaba, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 108 days.

(21) Appl. No.: 18/546,334

(22) PCT Filed: Dec. 20, 2021

(86) PCT No.: PCT/JP2021/047128
§ 371 (c)(1),
(2) Date: Aug. 14, 2023

(87) PCT Pub. No.: WO2022/190546
PCT Pub. Date: Sep. 15, 2022

(65) Prior Publication Data
US 2024/0120858 A1    Apr. 11, 2024

(30) Foreign Application Priority Data

Mar. 9, 2021   (JP) .................................. 2021-036847

(51) Int. Cl.
*H02P 5/00* (2016.01)
*H02P 5/46* (2006.01)
(Continued)

(52) U.S. Cl.
CPC ................ *H02P 5/74* (2013.01); *H02P 21/22* (2016.02)

(58) Field of Classification Search
CPC .................................. H02P 5/74; H02P 21/22
(Continued)

(56) References Cited

U.S. PATENT DOCUMENTS

| | | | |
|---|---|---|---|
| 8,680,794 B2 * | 3/2014 | Kazama | B60L 1/003 318/85 |
| 2002/0027789 A1 * | 3/2002 | Okushima | H02M 7/48 363/41 |

(Continued)

FOREIGN PATENT DOCUMENTS

| | | |
|---|---|---|
| JP | 6211336 B2 | 10/2017 |
| JP | 6528138 B2 | 6/2019 |

(Continued)

OTHER PUBLICATIONS

International Search Report issued in Intl. Appln. No. PCT/JP2021/047128 mailed Feb. 22, 2022. English translation provided.

(Continued)

*Primary Examiner* — Erick D Glass
(74) *Attorney, Agent, or Firm* — ROSSI, KIMMS & McDOWELL LLP

(57) ABSTRACT

An increase in noise can be suppressed. A motor control device includes N inverters configured to control N motors connected via power cables based on PWM signals, respectively, and a phase controller configured to determine phases of N carrier signals to be used for generating PWM signals to be supplied to the N inverters so that a sum of N vectors represented by noise amounts related to the respective N motors becomes zero.

11 Claims, 20 Drawing Sheets

(51) Int. Cl.
*H02P 5/74* (2006.01)
*H02P 21/22* (2016.01)

(58) Field of Classification Search
USPC .................................................. 318/49, 34
See application file for complete search history.

(56) References Cited

U.S. PATENT DOCUMENTS

| | | | |
|---|---|---|---|
| 2010/0117586 A1* | 5/2010 | Akiyama | H02P 21/0003 318/801 |
| 2011/0122661 A1* | 5/2011 | Sakakibara | H02P 29/50 363/37 |
| 2016/0043670 A1* | 2/2016 | Nakamura | B62D 5/0487 318/400.17 |
| 2017/0144567 A1 | 5/2017 | Takagi | |
| 2018/0091079 A1* | 3/2018 | Kashima | F25B 49/025 |
| 2019/0363600 A1 | 11/2019 | Matsumoto et al. | |

FOREIGN PATENT DOCUMENTS

| | | |
|---|---|---|
| JP | 6781190 B2 | 11/2020 |
| JP | 2020198677 A | 12/2020 |
| WO | 2016021007 A1 | 2/2016 |

OTHER PUBLICATIONS

Written Opinion issued in Intl. Appln. No. PCT/JP2021/047128 mailed Feb. 22, 2022. English translation provided.

* cited by examiner

MOTOR CONTROL DEVICE, MOTOR CONTROL METHOD, AND PROGRAM

FIELD

The present invention relates to a motor control device, a motor control method, and a program.

BACKGROUND

Conventionally, there is a motor control device (also referred to as a "driver") in which a PWM signal is transmitted to each of N inverters that respectively control N (N is a natural number of 2 or more) motors (axes), and the N inverters control the operation of the N motors (axes) (see, for example, Patent Documents 1-3).

PRIOR ART DOCUMENT

Patent Documents

Patent Document 1: Japanese Patent No. 6528138
Patent Document 2: Japanese Patent No. 6211336
Patent Document 3: Japanese Patent No. 6781190

The inverter includes a plurality of switching elements, and each switching element performs a switching operation according to a PWM signal and supplies a current of each phase of UVW to the motor via a power cable. The PWM signal supplied to each inverter is generated using a carrier signal (triangular wave) and a command signal for the operation of the motor. In such a motor control device, there is a problem that the carrier signals are synchronized with each other at the same phase between the axes, and when the current of the motor is controlled to zero, switching timings overlap between the axes, and noise generated accompanying the switching operation of the switching elements increases.

SUMMARY OF THE INVENTION

Problems to be Solved by the Invention

An object of the present disclosure is to provide a motor control device, a motor control method, and a program capable of suppressing an increase in noise.

Means for Solving the Problem

The present disclosure includes a motor control device including:
N inverters configured to control N motors connected via power cables based on PWM signals, respectively; and
a phase controller configured to determine phases of N carrier signals to be used for generating PWM signals to be supplied to the N inverters so that a sum of N vectors represented by noise amounts related to the respective N motors becomes zero.

According to the motor control device, since phases of the carrier signals are determined so that a sum of the N vectors becomes zero, the switching timings are prevented from overlapping due to the difference in phase, and an increase in noise is suppressed.

The motor control device of the present disclosure may adopt a configuration including an inductor and a capacitor, and further including a noise filter that suppresses common mode noise generated between the power supply and the ground. With such a configuration, magnetic saturation of the inductor in the noise filter can be suppressed.

In the motor control device of the present disclosure, the following configuration may be adopted. That is, the phase controller determines the phases of the N carrier signals so as not to generate a pair of carrier signals having phases different by 180°. According to the adoption of this configuration, it is possible to suppress the noise filter from generating heat due to the leakage current flowing through the capacitor of the noise filter. In addition, the common mode noise can be reduced without increasing the radiation noise.

In the motor control device of the present disclosure, the following configuration may be adopted. That is, the phase controller arranges the N vectors in descending order of the absolute values of the magnitudes, and in a case where the absolute value of the magnitude of the maximum vector is smaller than ½ of the total value of the absolute values of the magnitudes of the N vectors, creates a polygon including N sides in which the maximum vector is arranged on a bottom side and the remaining vectors are arranged as the remaining sides, and determines the relative angles between the bottom side and the respective remaining sides as the phases of the N carrier signals. By adopting such a configuration, N carrier signals having different phases can be obtained.

In the motor control device of the present disclosure, the following configuration may be adopted. That is, in the arrangement of the sides other than the bottom side, in a case where a trapezoid in which a sum of the vectors forming the already arranged sides is set as a lower bottom, the length of an oblique side is equal to any one of the remaining unarranged vectors, and a sum of lengths of the remaining sides excluding the lower bottom is equal to a magnitude of the remaining unarranged vectors can be created, the phase controller arranges any one of the remaining vectors in one of the oblique sides of the trapezoid so as to be continuous with the end point of the arranged vector arranged last. By adopting such a configuration, N carrier signals having different phases can be obtained.

In the motor control device of the present disclosure, the following configuration may be adopted. That is, the phase controller selects, as any one of the unarranged remaining vectors, a vector in which the magnitude of the vector is smaller than ½ of the sum of the absolute values of the magnitudes of the remaining vectors in descending order of the magnitudes of the vectors. By adopting such a configuration, the phases of the carrier signals can be evenly arranged.

In the motor control device of the present disclosure, the following configuration may be adopted. That is, the maximum value of the angle of the sides adjacent to each other in the polygon including the N sides is set to the value of the angle formed by the regular N-polygon. By adopting such a configuration, the phases of the carrier signals can be evenly arranged.

In the motor control device of the present disclosure, the following configuration may be adopted. That is, when there are a first vector and a second vector having a relative angle of 180° in the N vectors, the phase controller changes the relative angle to an angle deviated from 180° by an angle obtained by dividing an absolute value of a magnitude of the first vector and the second vector by a value twice as large as the maximum vector. By adopting such a configuration, it is possible to suppress heat generation due to a noise current flowing through the capacitor of the noise filter.

In the motor control device of the present disclosure, the following configuration may be adopted. That is, when the absolute value of the magnitude of the maximum vector when the N vectors are arranged in descending order of the absolute values of the magnitudes is larger than ½ of the total value of the magnitudes of the N vectors, the phase controller sets, for each of the vectors other than the maximum vector, the relative angle between the maximum vector and the vector other than the maximum vector to an angle deviated from 180° by an angle obtained by dividing the sum of the absolute value of the magnitude of the maximum vector and the absolute value of the magnitude of the vector other than the maximum vector by a value obtained by multiplying the absolute value of the magnitude of the maximum vector by two times. By adopting such a configuration, it is possible to weight the angle so that the larger the absolute value of the magnitude of the vector, the larger the angle to be deviated.

In the motor control device of the present disclosure, the following configuration may be adopted. That is, during the creation of the polygon, when a relative angle between two vectors of a vector to be arranged next and an arranged vector falls within a range obtained by increasing or decreasing, from 180°, a first value, which is a value obtained by dividing a sum of absolute values of magnitudes of the two vectors by two times an absolute value of a magnitude of the maximum vector, the phase controller sets the relative angle between the two vectors to an angle deviated from 180° by the first value in a positive direction. In this way, the relative angle between the two vectors can be prevented from becoming 180°.

The present disclosure includes a motor control method including acquiring, by a motor control device, phases of N carrier signals used for generating PWM signals to be supplied to N inverters that control N motors respectively connected via power cables based on PWM signals, as N vectors represented by noise amounts related to the respective N motors, and determining, by the motor control device, the phases of the carrier signals so that a sum of the N vectors becomes zero.

The present disclosure includes a program causing a computer to execute acquiring phases of N carrier signals used for generating PWM signals to be supplied to N inverters that control N motors respectively connected via power cables based on PWM signals, as N vectors represented by noise amounts related to the respective N motors, and determining the phases of the carrier signals so that a sum of the N vectors becomes zero.

According to the present disclosure, an increase in noise can be suppressed.

DETAILED DESCRIPTION

Application Example

A motor control device includes N inverters configured to control N motors connected via power cables based on PWM signals, respectively, and a phase controller configured to determine phases of N carrier signals to be used for generating PWM signals to be supplied to the N inverters so that a sum of N vectors represented by noise amounts related to the respective N motors becomes zero.

In the present specification, N or n represents a natural number of 2 or more, and the number of axes can be appropriately selected from 2 or more. By making the phases of the carrier signals different by such a configuration, it is possible to suppress occurrence of large noise due to overlapping of switching timings of switching elements included in the inverter between axes (motors).

Furthermore, in a case where the motor control device includes an inductor and a capacitor and further includes a noise filter that suppresses common mode noise generated between the power supply and the ground, magnetic saturation of the inductor of the noise filter can be suppressed by suppressing an increase in noise.

In addition, the phase controller of the motor control device determines the phases of the N carrier signals so as not to generate a pair of carrier signals having phases different by 180°. This prevents the noise current from flowing through the X capacitor of the noise filter to generate heat.

Hereinafter, a motor control device, a motor control method, and a program according to embodiments of the present application will be described with reference to the drawings.

<Configuration of Motor Control System>

Figure 1:
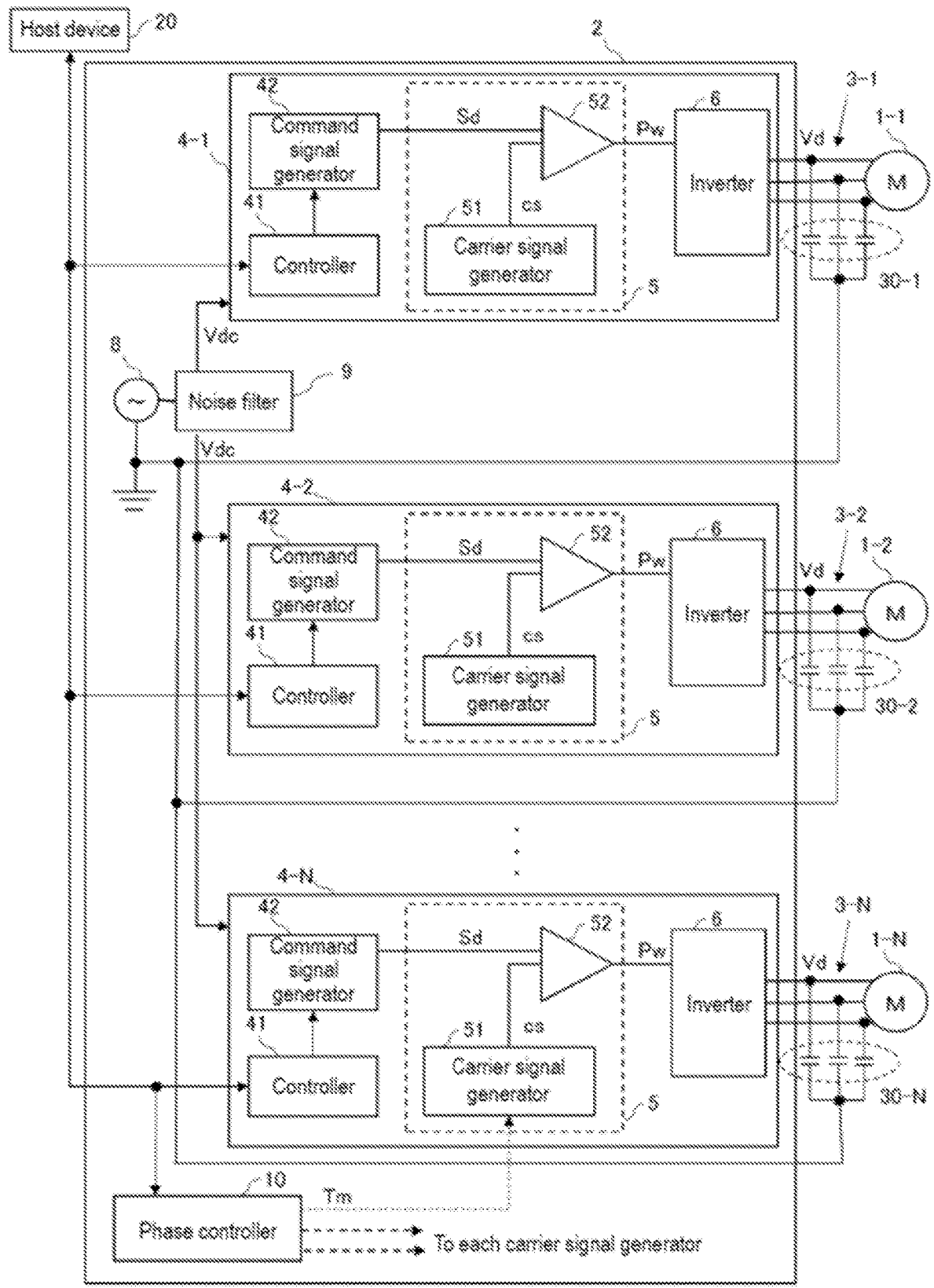
FIG. 1 is a diagram illustrating a schematic configuration of a motor control system.

FIG. 1 is a configuration diagram of a motor control system including a motor control device according to an embodiment. FIG. 1 illustrates, as an example, a configuration of a multiaxis motor control motor control device including a motor control device that controls a plurality of motors. In FIG. 1, the multiaxis motors are N motors 1-1, 1-2, . . . , 1-N as N (N is a natural number of 2 or more) axes. When the motors 1-1 to 1-N are not distinguished, they are referred to as "motors 1". The motor 1 is, for example, a three-phase brushless motor. Further, the motor control system includes a motor control device (also referred to as a driver) 2.

In order to control the motor control device 2 by a command or the like, the motor control system further includes a host device 20 using, for example, a personal computer (PC) or the like. The host device 20 and the motor control device 2 are communicably connected via a control bus line or the like, a command from the host device 20 is transmitted to the motor control device 2, and information from the motor control device 2 is transmitted to the host device 20.

The motor control device 2 includes motor control units (hereinafter, appropriately referred to as control units) 4-1, 4-2, . . . , and 4-N respectively corresponding to the motors 1-1 to 1-$n$ in order to control the motors 1 for N axes. When the control units 4-1 to 4-N are not distinguished, they are referred to as "control units 4". In the case of N=2, unlike FIG. 1, two motors 1 and two control units 4 are provided.

FIG. 1 illustrates a configuration example in which the control unit 4-1 controls the motor 1-1, the control unit 4-2 controls the motor 1-2, and the control unit 4-N controls the motor 1-N. Each of the control units 4-1 to 4-$n$ includes an inverter 6, and the inverter 6 is connected to any one of the corresponding motors 1-1 to 1-$n$ via a power cable 3-1, 3-2, . . . , 3-N. When the power cables 3-1, 3-2, . . . , and 3-N are not distinguished, they are referred to as "power cables 3". Each of the power cables 3 includes U-phase, V-phase, and W-phase power cables.

A power supply voltage Vdc is commonly supplied from a power supply 8 to each of the control units 4-1 to 4-N. A noise filter 9 is inserted between the power supply 8 and a supply line of the power supply voltage Vdc. The noise filter 9 includes an inductor element and a capacitor (X capacitor), and is provided to suppress common mode noise due to leakage current caused by stray capacitances 30-1, 30-2, . . . , and 30-N (related to the respective motors 1) of the respective axes.

Each of the control units 4-1 to 4-$n$ includes a controller 41, a command signal generator 42, a PWM signal generator 5, and an inverter 6 as a circuit that operates using the power supply voltage Vdc, and drives the motor 1 via the inverter 6. The PWM signal generator 5 includes a carrier signal generator 51 and a comparator 52.

In each of the control units 4, the controller 41 is communicably connected to the host device 20. Command information for instructing a position, speed, torque, and the like is transmitted from the host device 20 to the controller 41. In addition, the controller 41 transmits information of the control unit 4 and the like to the host device 20. The controller 41 controls each part in the control unit 4 such as the command signal generator 42 and the PWM signal generator 5 together with such a communication function, and performs operation control so that the motor 1 performs predetermined movement such as speed and position.

The command signal generator 42 generates a command signal Sd based on the operation command for instructing the position, speed, torque, and the like from the controller 41, and supplies the command signal Sd to the PWM signal generator 5. The command signal Sd includes command signals for three phases of the U phase, the V phase, and the W phase, and is a signal having a sinusoidal waveform deviated from each other by 120° in each phase corresponding to the rotational speed and the torque amount required for the motor 1. Note that, since the rotation of the motor 1 is stopped at the time of servo lock, the amplitude of the command signal Sd is 0.

The PWM signal generator 5 includes a carrier signal generator 51 and a comparator 52. Although not illustrated in FIG. 1, the comparator 52 has components corresponding to three phases of a U phase, a V phase, and a W phase. The comparator 52 is supplied with the carrier signal from the carrier signal generator 51 and the command signal Sd from the command signal generator 42.

The carrier signal generator 51 generates and outputs a carrier signal Sc that is a triangular wave for generating a pulse-width modulated signal. When synchronization is performed on a plurality of axes, the carrier signals Sc are generally synchronized between the control units 4 in order to ensure synchronization accuracy. In the embodiment, timing signals Tm from the phase controller 10 are supplied to the respective PWM signal generators 5 of the control units 4. In the control units 4-1 to 4-N, the carrier signal generator 51 generates the carrier signal Sc at the phase timing designated by the timing signal Tm. As a result, the phases of the carrier signals between the axes are evenly arranged (deviated) in 360°, and are synchronized in this deviated state.

Such a carrier signal Sc is supplied to a comparator 52. The comparator 52 generates a PWM signal Pw by comparing the levels of the command signal Sd and the carrier signal Sc, and outputs the PWM signal Pw to the inverter 6. The PWM signal Pw includes a pulse train whose pulse width is modulated corresponding to the level of the command signal Sd. Although not illustrated in FIG. 1, the PWM signal Pw includes not only a positive-phase signal but also a reverse-phase inverted signal provided with on-delay.

The inverter 6 includes switching elements such as a plurality of insulated gate bipolar transistors (IGBTs). Upon receiving the PWM signal Pw from the PWM signal generator 5, the inverter 6 generates a drive voltage Vd by switching the voltage supplied from the power supply 8 corresponding to the PWM signal Pw using switching elements. The inverter 6 applies the drive voltage Vd to the motor 1 via the power cable 3 including U-phase, V-phase, and W-phase motor lines. Note that, the actual inverter 6 includes three pairs of inverters, and drives (controls) the motor 1 in three phases of a U phase, a V phase, and a W phase.

As described above, each control unit 4 generates the drive voltage Vd for driving the motor 1 based on the command from the host device 20, and applies the generated drive voltage Vd to the motor 1 to drive the motor 1.

As described above, in the embodiment, as an example, the motor control device 2 includes the phase controller 10. The phase controller 10 determines the phases of carrier signals (triangular wave) of the respective control units 4 (for each axis), and supplies the timing signals Tm to the PWM signal generators 5 (carrier signal generators 51) of the control units 4. The timing signal Tm includes a clock signal for digital processing and a signal for indicating a phase timing (phase angle) of the carrier signal.

The phase controller 10 can communicate with the host device 20 and can receive information necessary for determining the phase from the host device 20. Note that, the phase determination processing of each axis performed by the phase controller 10 may be performed by the controllers 41 in the control units 4-1 to 4-$n$ in cooperation with each other instead of the phase controller 10, or may be performed by the host device 20 instead of the phase controller 10.

Reference Example

Figure 2A:
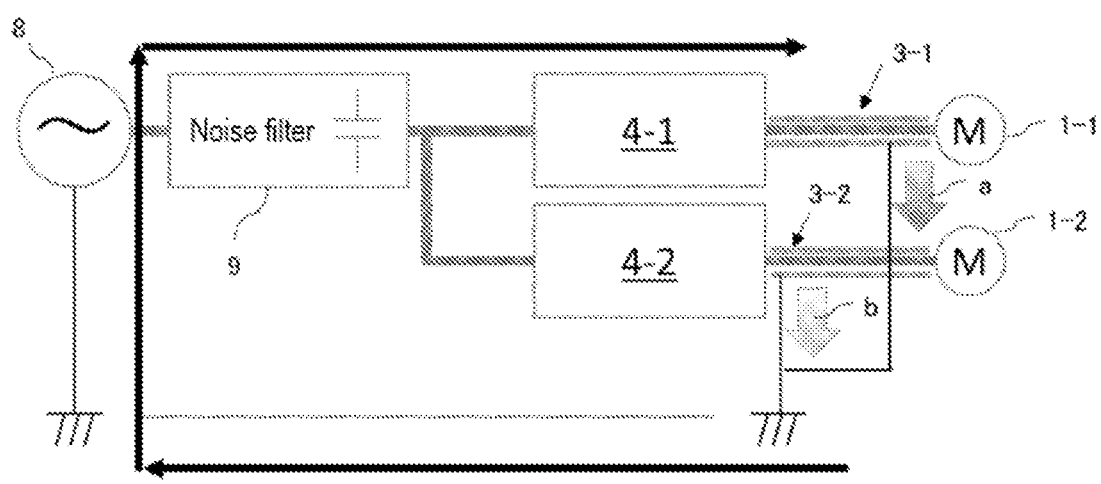
FIGS. 2A to 2C are explanatory diagrams of a reference example.
Figure 2B:
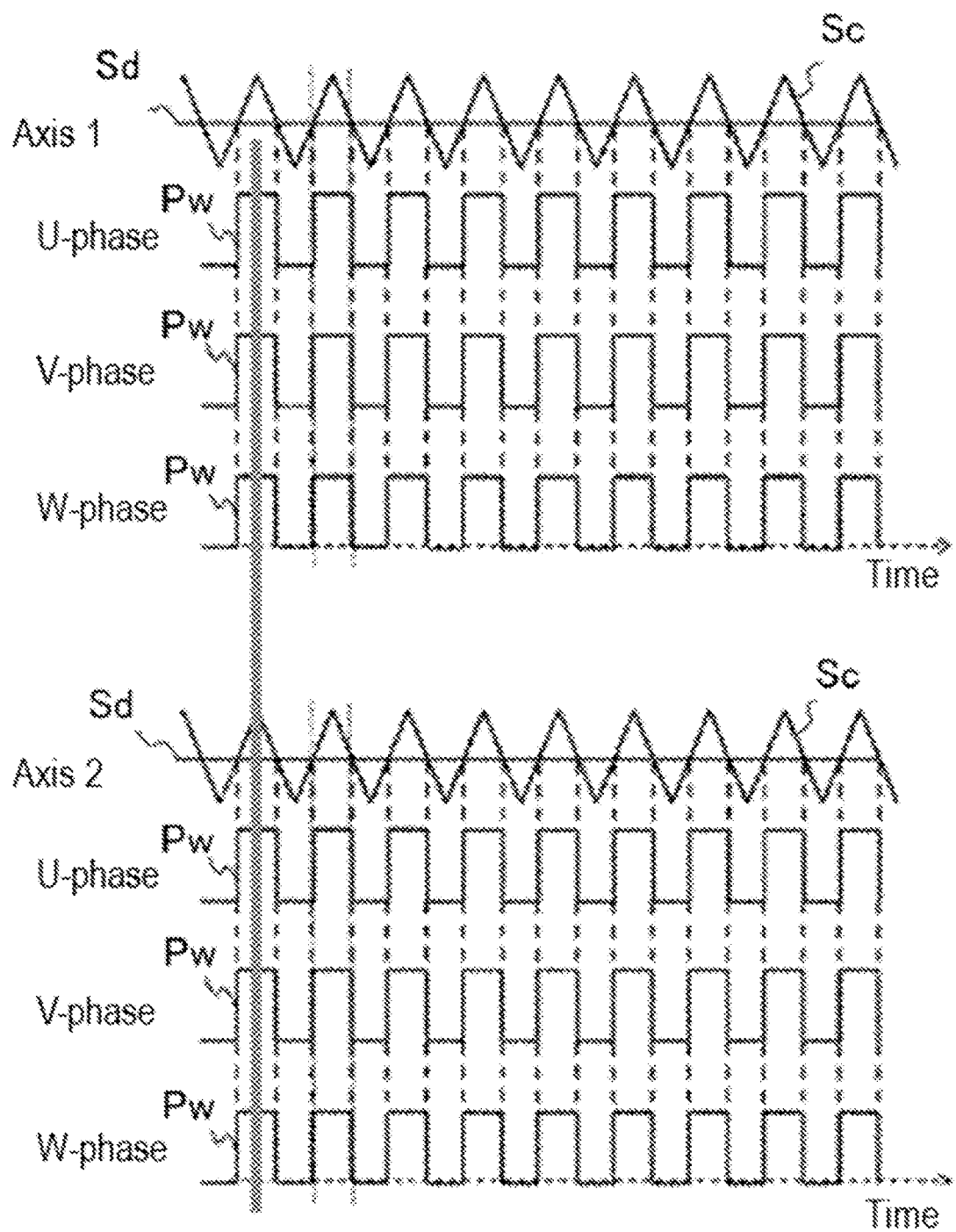
Figure 2C:
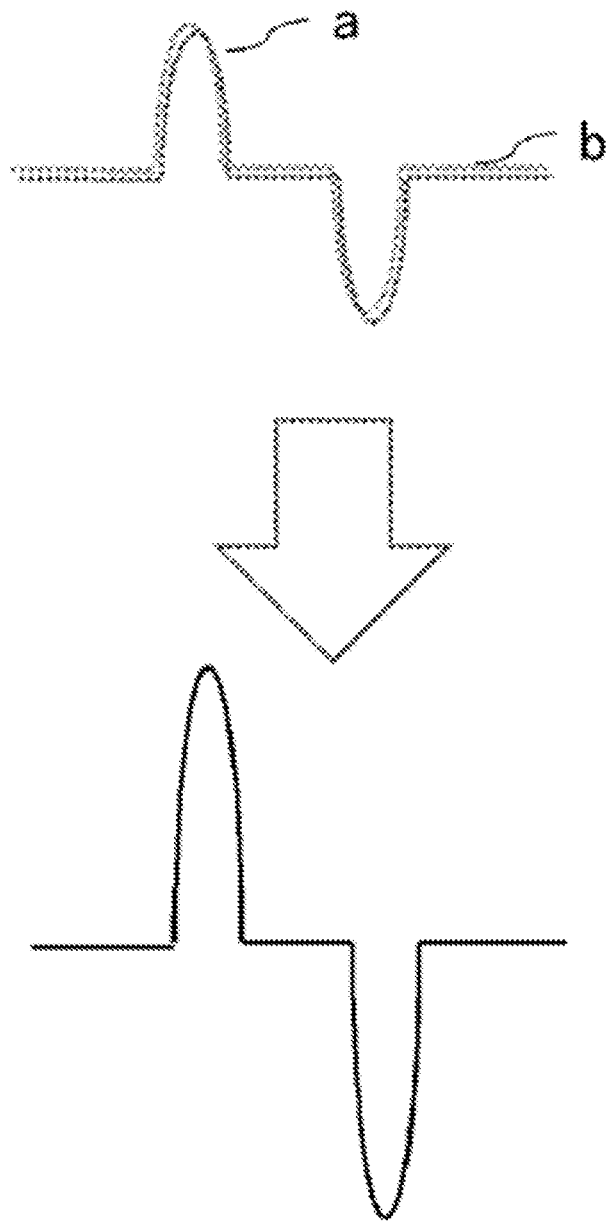

In describing the phase controller 10 in detail, a reference example and its drawbacks will be described. FIGS. 2A to 2C are explanatory diagrams of a reference example. In FIG. 2A, a motor control system according to the reference example includes a power supply 8, a noise filter 9, control units 4-1 and 4-2, power cables 3-1 and 3-2, and motors 1-1 and 1-2 in the configuration of the motor control system illustrated in FIG. 1.

FIG. 2B illustrates PWM signals Pw of respective UVW phases generated in the control unit 4-1 corresponding to the motor 1-1 (axis 1) and PWM signals Pw of respective UVW phases generated in the control unit 4-2 corresponding to the motor 1-2 (axis 2). In each of the axes 1 and 2, the PWM signal Pw in which the pulse is turned on while the level of the carrier signal Sc is equal to or higher than the level of the command signal Sd is generated.

Normally, when PWM control is performed, the PWM signal generator of the control unit 4 compares the carrier signal Sc of the triangular wave with the command signal Sd, and switching of the switching element in the inverter 6 is performed. In a scene where no current flows through the motors 1-1 and 1-2, such as when the motors 1-1 and 1-2 are stopped, the same voltage is applied to all of the U phase, the V phase, and the W phase. Therefore, the switching timings of the switching elements are aligned between the axis 1 and the axis 2. At the time of switching, a leakage current a flows from the power cable 3-1 and a leakage current b flows from the power cable 3-2 through stray capacitances of the respective power cables 3-1 and 3-2, or the like. The leakage current flows to the power supply 8 through the ground and flows to each control unit 4 (indicated by a thick arrow in FIG. 2A). In this manner, common mode noise is generated between the power supply 8 and the ground. As described above, when the switching timings between the axes are aligned, noise is simultaneously generated and superimposed on each of the axes 1 and 2, and the wave height of the noise increases as illustrated in FIG. 2C.

Noise that flows to the power supply 8 from the ground can be suppressed by the noise filter 9. However, there is a problem that the inductor included in the noise filter 9 is magnetically saturated due to the noise increased by the superimposition as described above, and the noise removal performance of the noise filter 9 is deteriorated. The motor control device 2 according to the embodiment includes the phase controller 10 in order to solve the above problem.

<Phase Controller>

The phase controller 10 of the motor control device 2 deviates and synchronizes the phases of the carrier signals Sc with respect to the N axes (motors 1-1 to 1-N) that operate in synchronization. The phase controller 10 determines the phase of each axis so that the phase is deviated by the following method.

(A) Distributed Arrangement of Phase

The phases of the respective axes are uniformly arranged within 360°. Here, "uniformly arranged" means that noise coming out of each axis is regarded as a vector including the noise amount and the phase of the carrier signal, and the sum (centroid) of the vectors is determined to be zero (0). The noise coming out of each axis can be considered to be proportional to the stray capacitance of each axis or the length of the power cable of each axis.

Figure 3A:
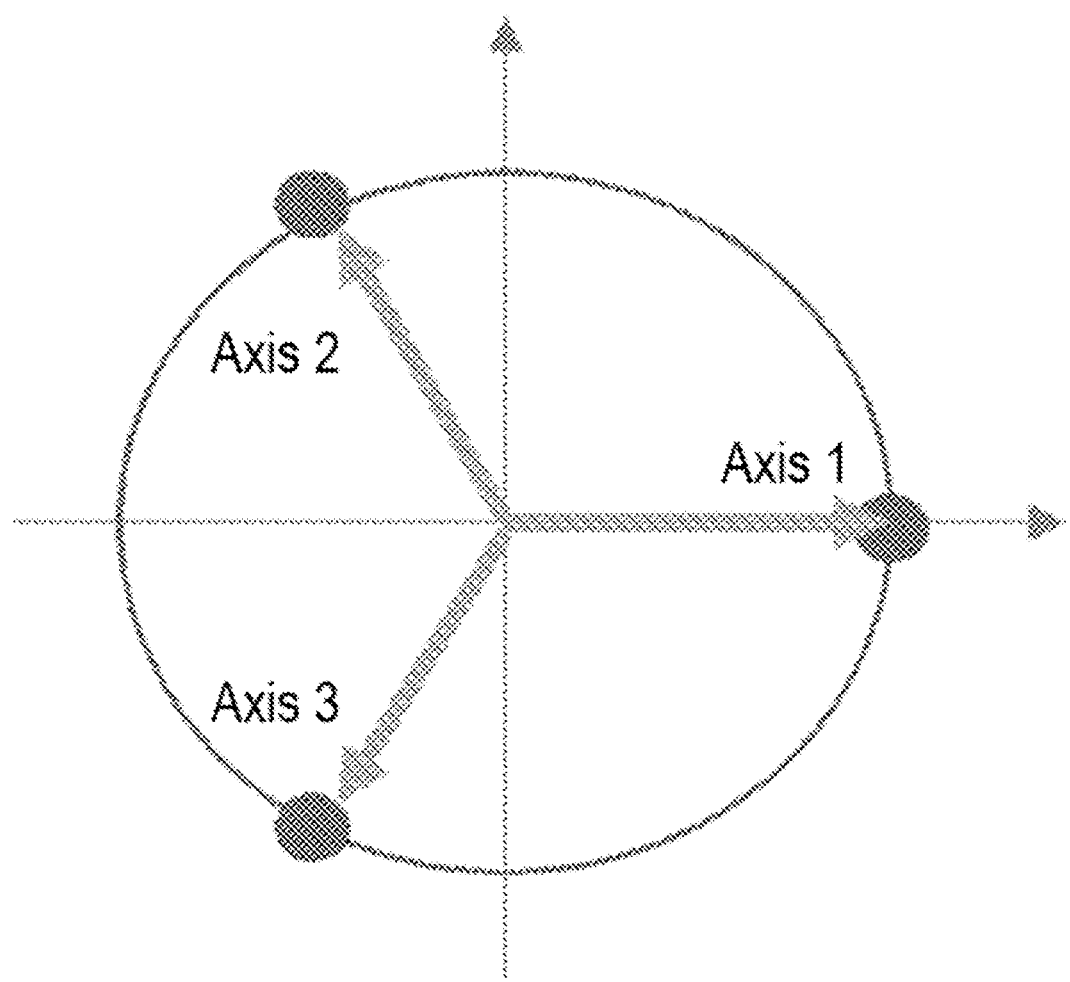
FIGS. 3A and 3B are explanatory diagrams of distributed arrangement of phase.
Figure 3B:
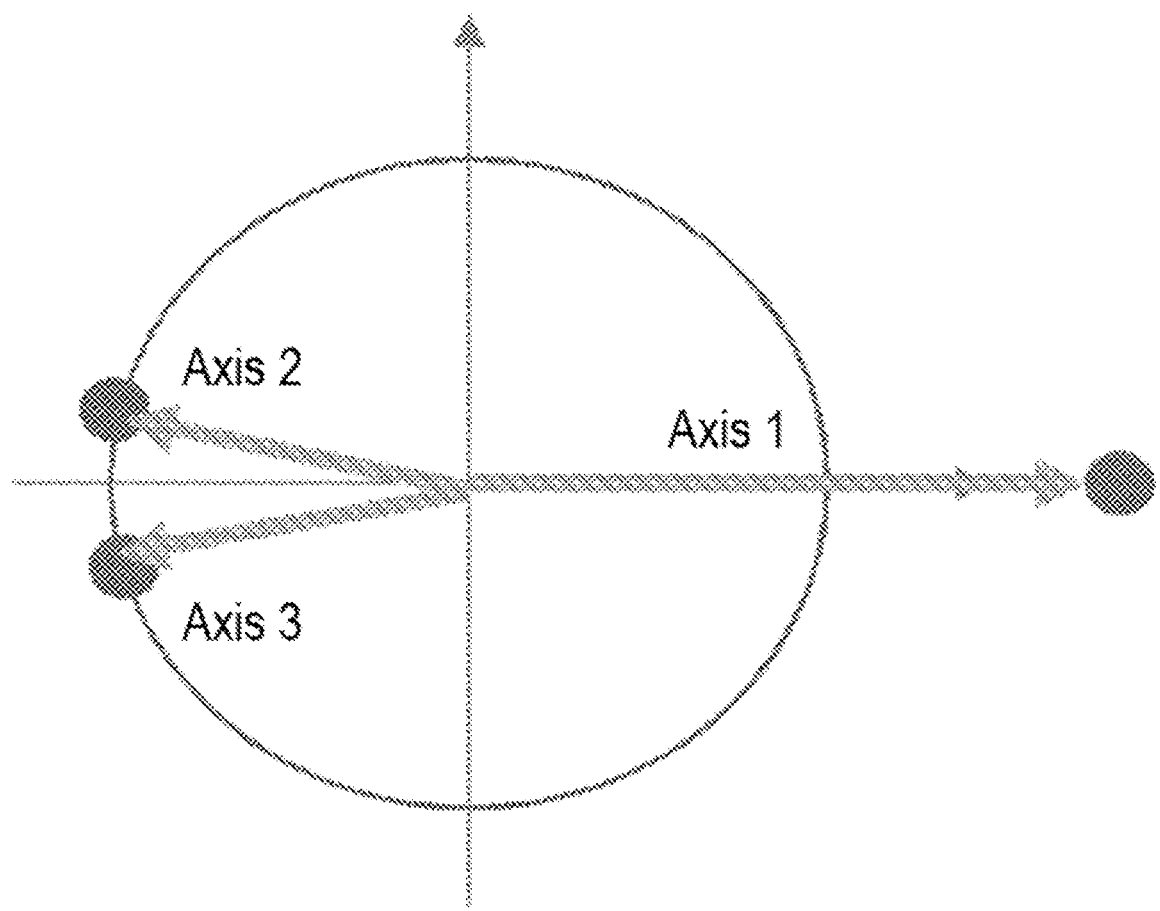

FIGS. 3A and 3B are explanatory diagrams of distributed arrangement of phase. For example, as illustrated in FIG. 3A, in the three-axis synchronization control, when the noise coming out of each axis is equal (stray capacitance of each axis is equal), the phases of the carrier waves are deviated by 120° for each axis and synchronized. Further, for example, as illustrated in FIG. 3B, in the three-axis synchronization control, when the noise of the axis 1 is larger than noise of the axes 2 and 3, the phases of the carrier signals are determined so that the vector sum of the axes 1 to 3 becomes 0. Here, the length of the vector represents a magnitude (an example of the noise amount related to each motor) of the stray capacitance (or the power cable length) related to each axis, and an angle based on the vector of the axis 1 represents the phase of the carrier signal of each axis.

(B) Avoiding Vector Pairs with Phase Difference of 180°

Figure 4A:
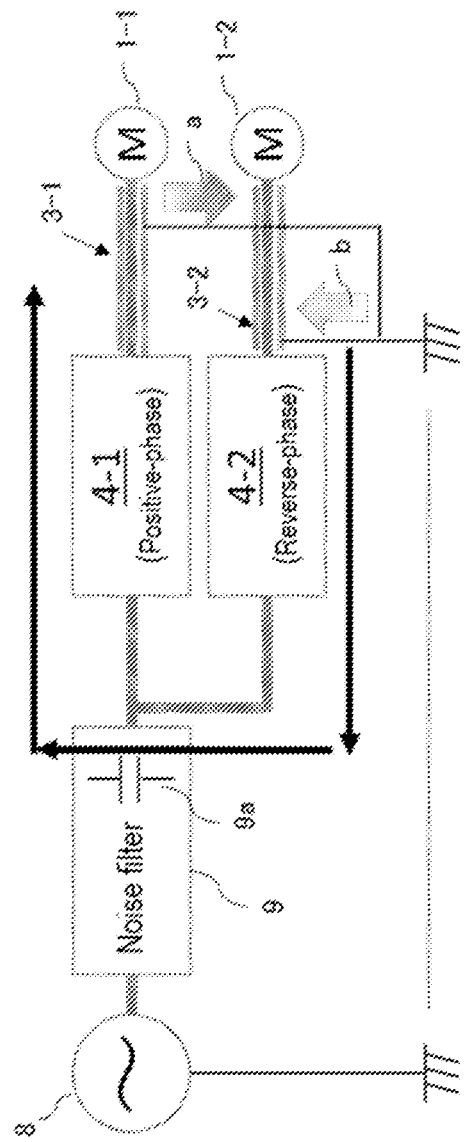
FIGS. 4A to 4C are explanatory diagrams of avoidance of a pair having phases different by 180° using a reference example.
Figure 4B:
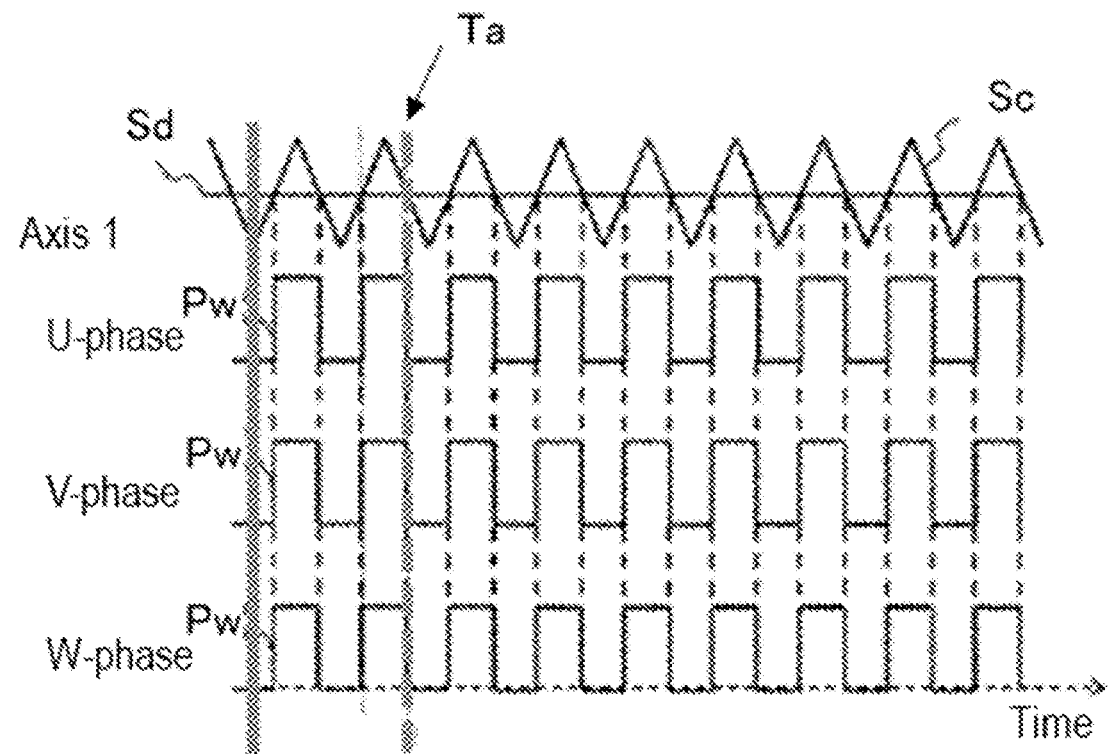
Figure 4B:
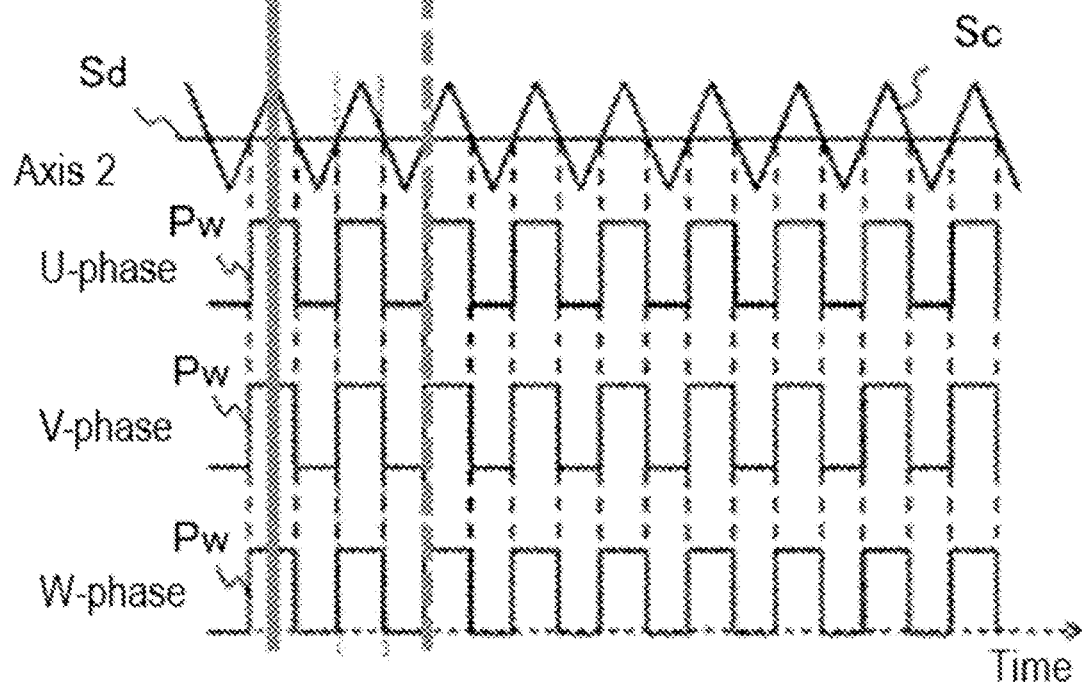
Figure 4C:
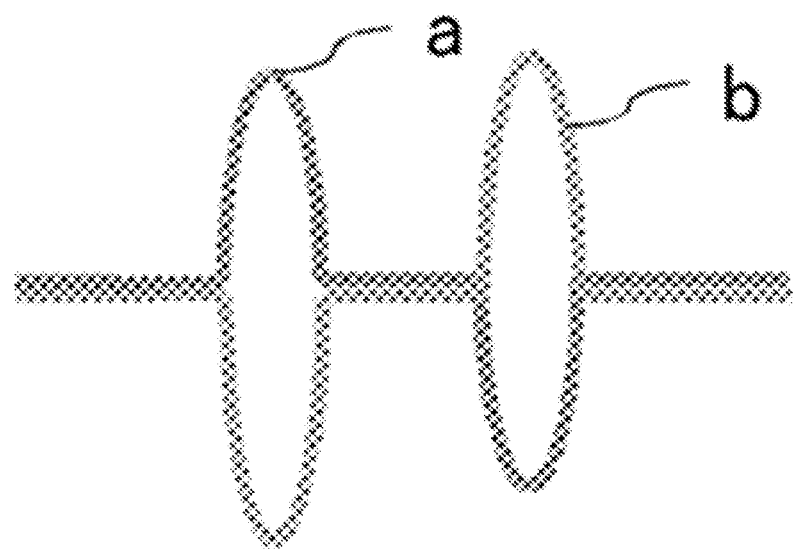

For example, in a case where the number of axes is two, when the vector sum is set to zero by the above-described method, the phase difference between the two vectors becomes 180°. However, in determining the phase of the carrier signal, a pair having phases different by 180° as described above is avoided. FIGS. 4A to 4C are explanatory diagrams of the reason for avoiding a pair having phases different by 180° using the reference example.

When the phase difference is 180°, as illustrated in FIG. 4B, the timing when the PWM signal is turned off and the timing when the PWM signal is turned on may coincide with each other between the axes. In the example illustrated in FIG. 4B, at time Ta, the PWM signal of the axis 1 is switched off, and at the same time, the PWM signal of the axis 2 is switched on.

In the motor control device according to the reference example illustrated in FIG. 4A, since the phase difference is 180°, the on and off timings coincide with each other, so that the control unit 4-1 has a positive-phase, the control unit 4-2 has a reverse-phase, and the leakage currents a and b flowing in the common mode pass through the X capacitor 9a in the noise filter and flow between the control unit 4-1 and the control unit 4-2 (see the thick arrow in FIG. 4A). In a state where such a state constantly occurs, there is a problem that the X capacitor 9a generates heat. Therefore, the phase controller 10 avoids forming a pair having phases different by 180° in the determination of the phase.

<<Details of Method of Determining Phase>>

Hereinafter, details of a method of determining the phase of the carrier signal will be described. To determine phases of the N carrier signals corresponding to the number N of axes, the N carrier signals are regarded as N vectors $C_1$ to $C_n$. The vectors $C_1$ to $C_n$ have a magnitude corresponding to a noise amount (proportional to the stray capacitance of each axis or the length of the power cable) related to the N axes (the motors 1-1 to 1-N).

The phases are arranged so that the angle varies as much as possible and the vector sum is zero. Therefore, a polygon as close as possible to a circle is created with the vector having the largest absolute value among the N vectors as the bottom side.

FIGS. 5, 6A and 6B, 7A and 7B, and 8A and 8B are explanatory diagrams illustrating an example of a phase arrangement method. Here, a case where the number of carrier signals, that is, vectors is six will be described as an example. It is assumed that the magnitude of the vector is $C_1 \geq C_2 \geq C_3 \geq C_4 \geq C_5 \geq C_6$. First, an equilateral triangle having a peripheral length of $C=C_1+C_2+C_3+C_4+C_5+C_6$ is considered.

Figure 5:
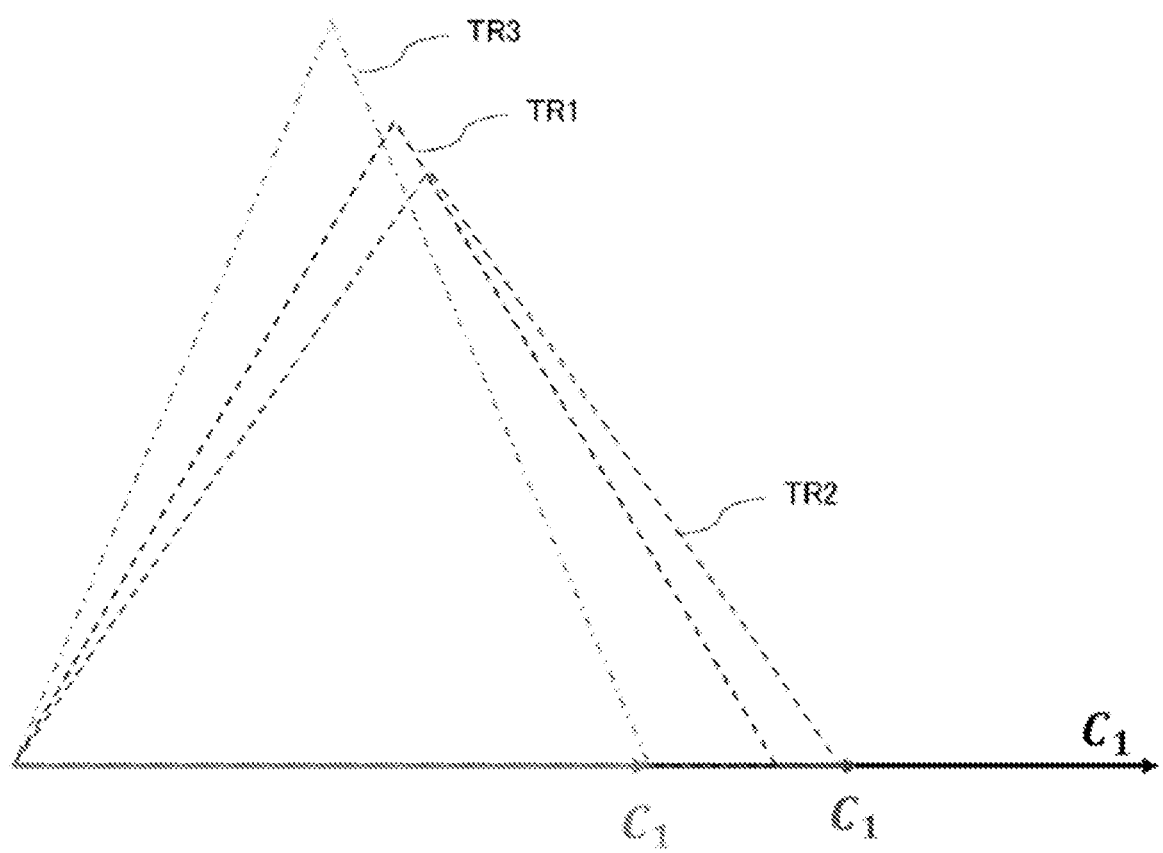
FIG. 5 is an explanatory diagram illustrating an example of a phase arrangement method.

As illustrated in FIG. 5, a vector $C_1$ is set at the bottom side of an equilateral triangle. At this time, in a case where the vector $C_1$ satisfies $C_1 > C/2$, a polygon cannot be formed. In this case, in order to minimize the absolute value of the vector sum, the remaining vectors $C_2$ to $C_n$ are arranged in a direction of 180° with respect to $C_1$.

On the other hand, when the vector $C_1$ satisfies $C/3 \leq C_1 \leq C/2$, it is possible to create a polygon having a height lower than that of the equilateral triangle TR1 (see triangle TR2). In addition, in a case where the vector $C_1$ satisfies $C_1 \leq C/3$, it is possible to create a polygon having a height higher than that of the equilateral triangle TR1 (see triangle TR3).

A method of creating the polygon is as follows. As an example, a case where $C_1=10$, $C_2=8$, $C_3=7$, $C_4=7$, $C_5=3$, $C_6=1$, and $C=36$ will be described. First, the maximum vector $C_1$ is arranged on the bottom side. At this time, the polygon having the highest height that can be created with the lengths of the remaining vectors $C_2$ to $C_6$ is an isosceles triangle having a bottom side of 10 and an oblique side of $(36-10)/2=13$.

Here, if the next side is arranged at the same angle as the bottom angle of this isosceles triangle, a polygon having an angle larger than the angle (360°) of the circle in the height direction is formed. Therefore, $C_2$ is arranged so as to have the same angle as a bottom angle of a trapezoid in which the oblique side is equal to the vector $C_2$, and the length of the sides excluding the bottom side is equal to the magnitude of the remaining vectors $C_3$ to $C_6$ (see FIG. 6A).

Figure 6A:
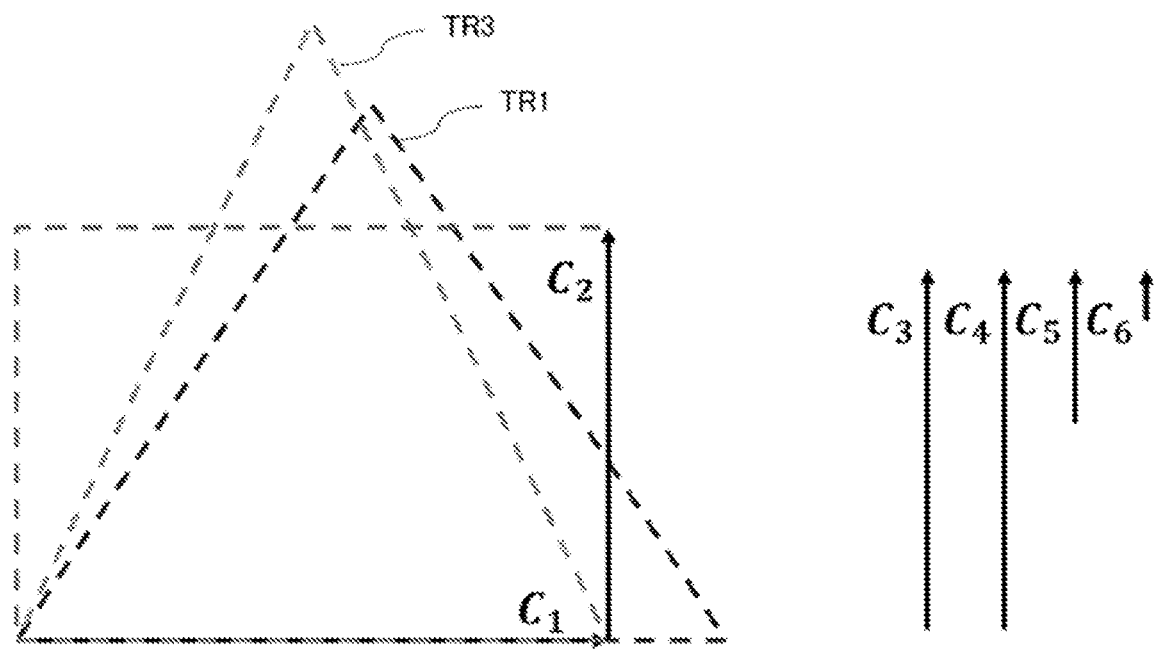
FIGS. 6A and 6B are explanatory diagrams illustrating an example of a phase arrangement method.
Figure 6B:
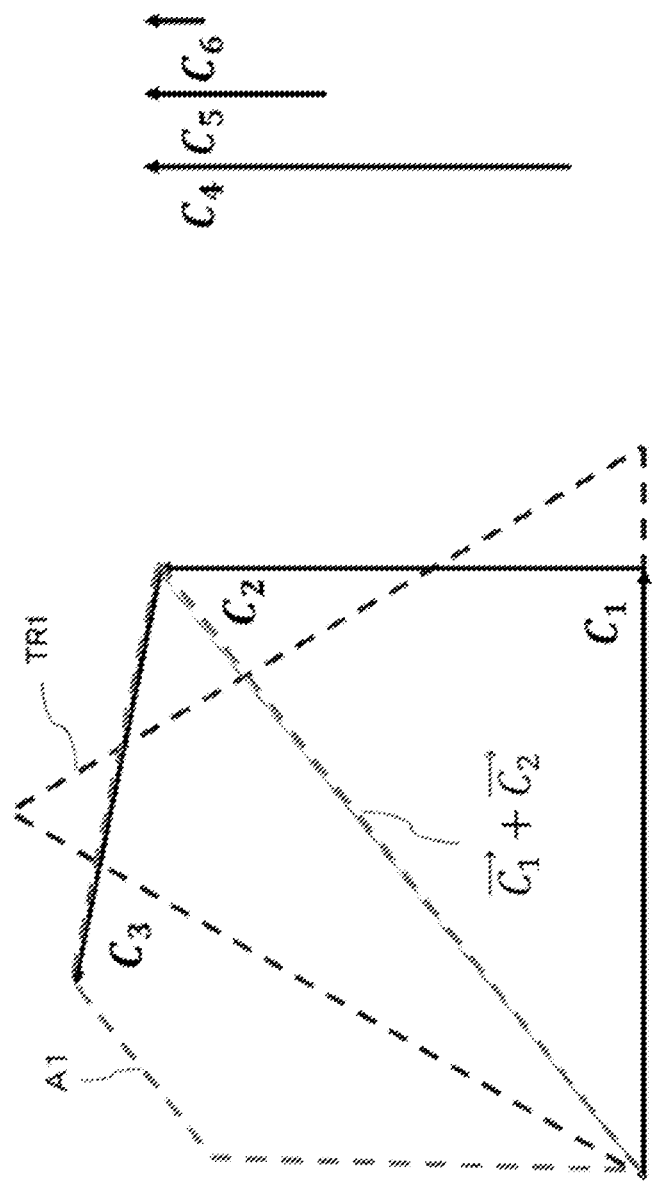

Note that, in the example illustrated in FIG. 6A, an angle formed by $C_1$ and $C_2$ accidentally becomes a right angle, and is not a trapezoid but a rectangle. Depending on the length of the vectors, there is a case where the upper bottom of the trapezoid is larger than the lower bottom, the bottom angle is larger than the right angle, and the height of the entire polygon is too low. Therefore, the maximum value of the angle formed by the two vectors is set to an angle formed by two sides in a regular n-polygon when the number of vectors is n (n is a natural number of 2 or more).

Next, it is attempted to draw a trapezoid A1 with the vector $C_1+C_2$ as the bottom side, the oblique side being equal to the vector $C_3$, and the sum of the lengths of the sides excluding the lower bottom being equal to the magnitude of the remaining vectors $C_3$ to $C_6$. At this time, since a desired trapezoid A1 can be drawn, the vector $C_3$ is arranged on the oblique side of the trapezoid following the side of the vector $C_2$ (see FIG. 6B).

Next, as in the previous step, it is attempted to draw a trapezoid with the vector $C_1+C_2+C_3$ as the bottom side, the oblique side being equal to $C_4$, and the sum of the lengths of the sides excluding the lower bottom being equal to the magnitude of the remaining vectors $C_4$, $C_5$, and $C_6$. However, since $C_4>(C_4+C_5+C_6)/2$ holds, a trapezoid cannot be drawn. Therefore, it is attempted to draw a trapezoid A2 with $C_4$ and $C_5$ being exchanged, the oblique side being equal to the vector $C_5$, and the sum of the lengths of the sides excluding the lower bottom being equal to the magnitude of the remaining vectors $C_4$, $C_5$, and $C_6$. In this case, since a desired trapezoid A2 can be drawn, the vector $C_5$ is arranged on the oblique side of the trapezoid A2 following the side of the vector $C_3$ (see FIG. 7A). When the number of remaining vectors is two, the angles of the remaining vectors $C_4$ and $C_6$ are uniquely determined (see FIG. 7A).

Figure 7A:
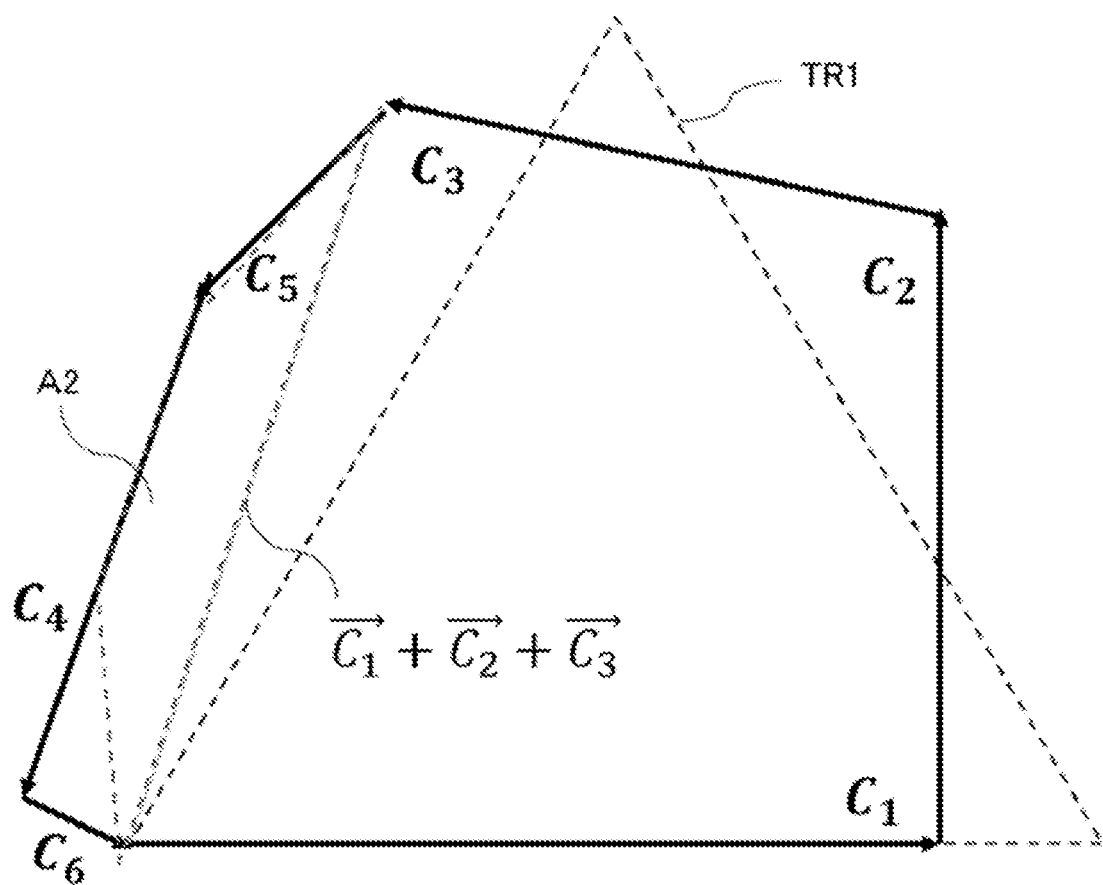
FIGS. 7A and 7B are explanatory diagrams illustrating an example of a phase arrangement method.
Figure 7B:
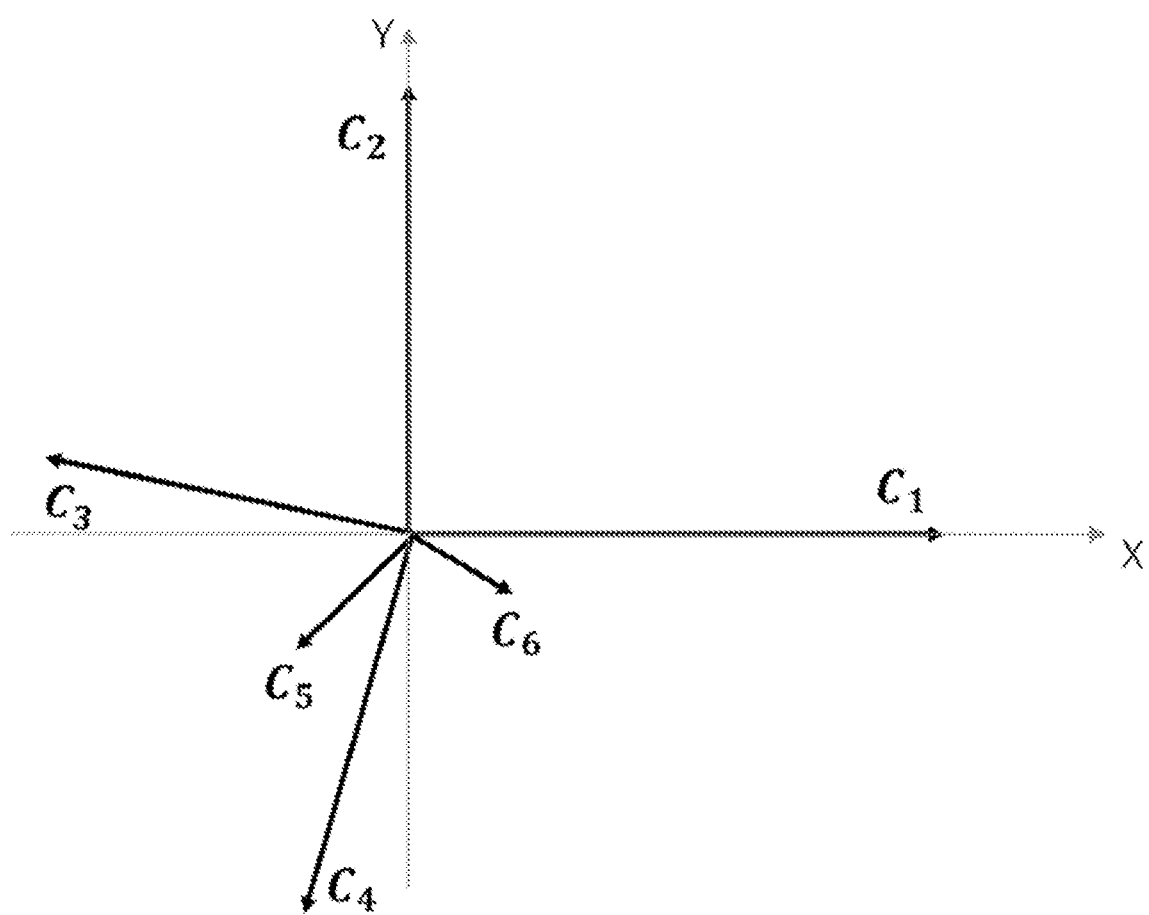
Figure 8A:
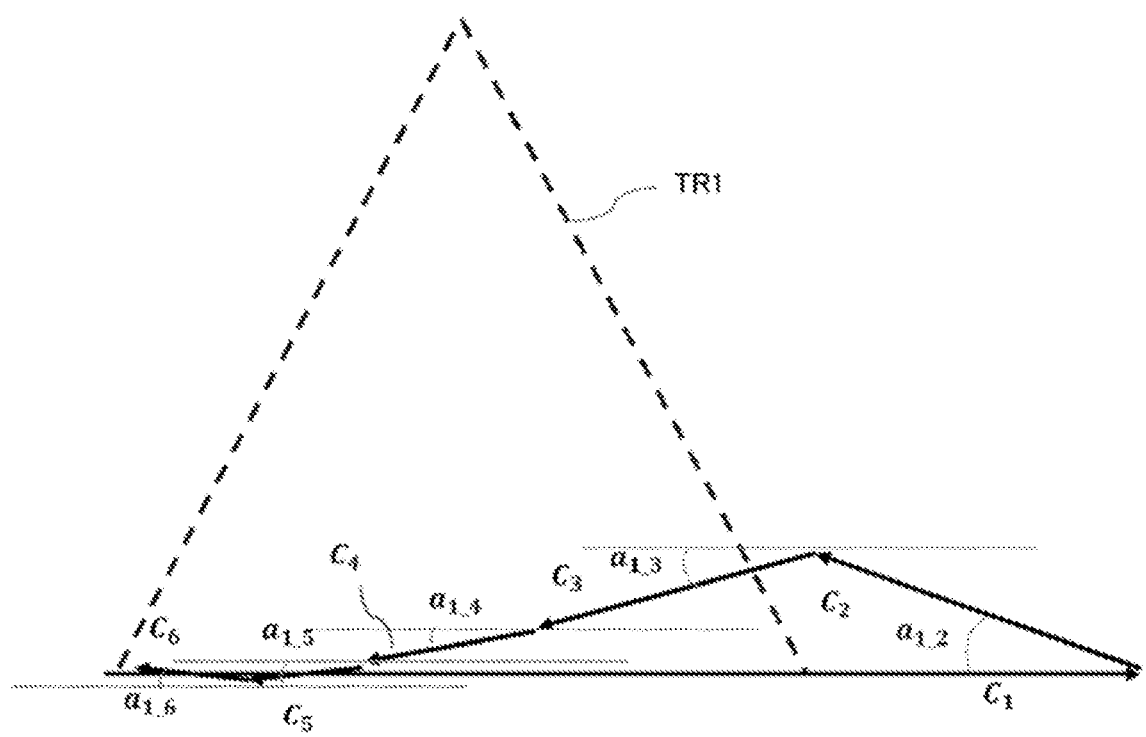
FIGS. 8A and 8B are explanatory diagrams illustrating an example of a phase arrangement method.
Figure 8B:
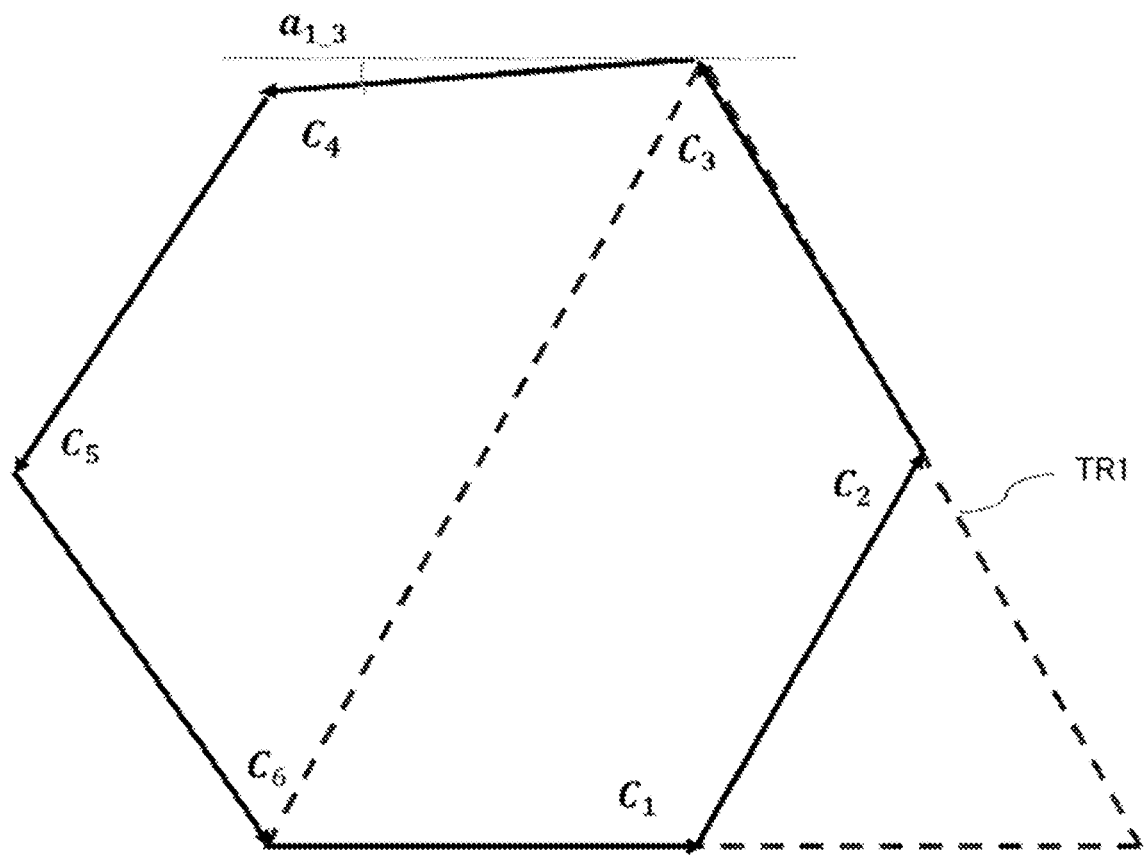

When the polygon is completed, as illustrated in FIG. 7B, the vectors are moved so that the start points of the vectors $C_1$ to $C_6$ are located at the origin of the orthogonal axis. By the movement, relative angles, that is, phases of the remaining vectors $C_2$ to $C_6$ with reference to the vector $C_1$ are determined. The phases of the respective carrier signals of the N axes are arranged (determined) in a state having angular differences of the vectors $C_1$ to $C_6$.

However, when there is a pair of vectors having a relative angle of 180° between the vectors, there is a problem that a large current flows through the X capacitor 9a due to the above reason (see FIG. 4A). Therefore, the absolute value of the noise current is reduced by changing the angles of the vectors having the relative angle of 180°.

Here, if the magnitude of the vector is small, the influence on noise is small, and thus weighting can be performed with the magnitude of the vector. Therefore, in the embodiment, when the relative angle between two vectors $C_x$ and $C_y$ among the N vectors is 180°, the angle formed by $C_x$ and $C_y$ is deviated from 180° by $(C_x+C_y)/2C_1=a_{x\_y}°$.

In addition, when the vector $C_1$ satisfies $C_1>C/2$, a polygon cannot be formed. For each of the vectors $C_2$ to $C_6$ other than the vector $C_1$, the relative angle with the vector $C_1$ is set to 180°. However, since it is preferable to avoid that the relative angle becomes 180°, the following processing is performed so as to minimize the magnitude of the vector sum (see FIG. 8A). That is, the angle of the vector $C_x$ ($C_2$ to $C_6$) other than the vector $C_1$ is deviated from 180° by $(C_x+C_1)/2C_1=a_{1\_x}°$. First, the vector $C_2$ is deviated from 180° by $a_{1\_2}°$ in the negative direction and arranged. The vector $C_3$ and the subsequent vectors are deviated in a direction in which the absolute value of the vector sum in the Y direction decreases.

In addition, there is a case where $C_1<C/2$ holds, and the relative angle between certain vectors may fall within the range of $180\pm(C_x+C_y)/2C_1$ in the middle of creating a polygon. In this case, the vector $C_2$ is arranged at an angle deviated from 180° by $(C_x+C_y)/2C_1=a_{x\_y}°$ in the positive direction. Thereafter, the angles of the remaining vectors are determined by a trapezoid with the vector sum as a bottom side. In a case where the relative angle between the two vectors falls within the range of $180\pm(C_x+C_y)/2C_1$ when the remaining vectors become two, deviating the angle by $(C_x+C_y)/2C_1=a_{x\_y}°$ is prioritized over forming a polygon.

<<Configuration Example of Phase Controller>>

Figure 9:
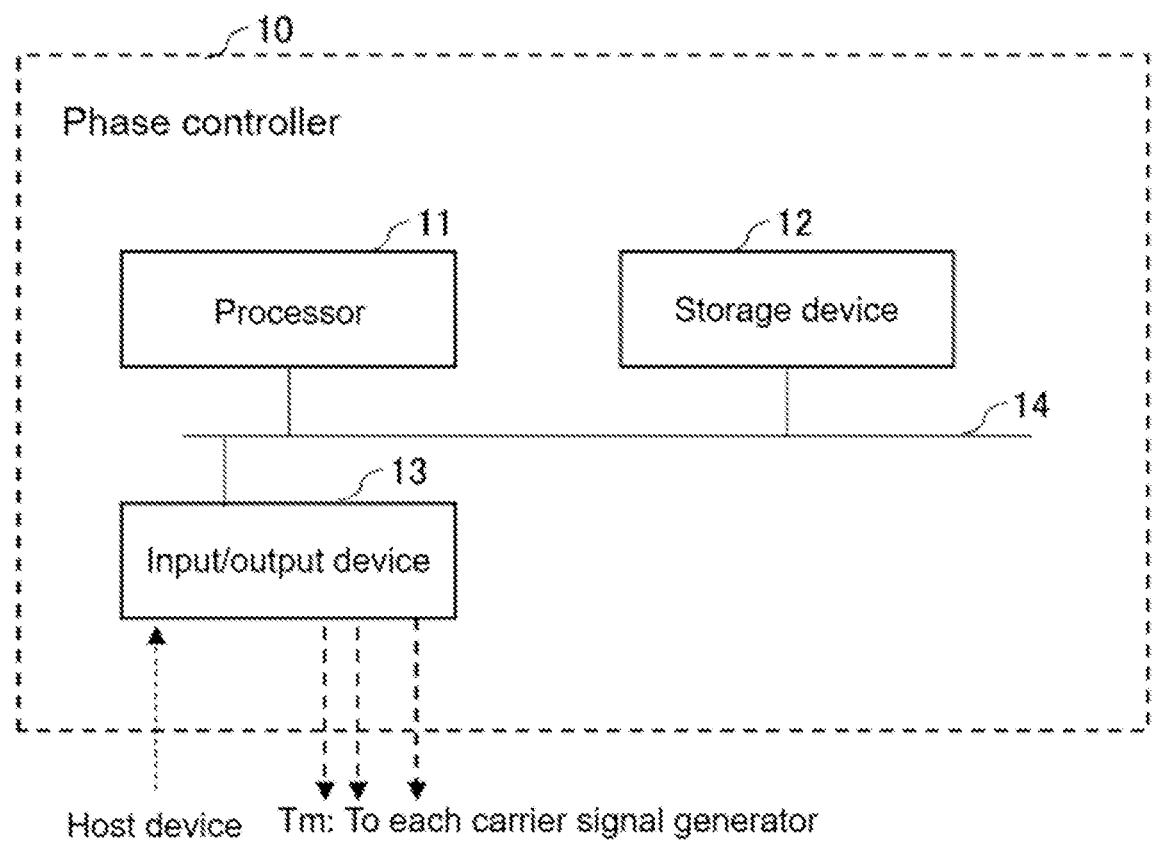
FIG. 9 is a diagram illustrating a configuration example of a phase controller.

FIG. 9 is a diagram illustrating a configuration example of the phase controller 10. In FIG. 9, the phase controller 10 includes a processor 11, a storage device 12, and an input/output device (I/O) connected to each other via a bus 14. The storage device 12 includes a main storage device such as a RAM and a ROM, and an auxiliary storage device such as a hard disk drive (HDD) and a solid state drive (SSD), and is used to store data of each axis and a program. The storage device 12 stores a program for determining the phase of the carrier signal corresponding to each axis and data related to the determination of the phase.

For example, the storage device stores in advance data indicating the noise amount for each axis (motor 1). The data indicating the noise amount may be stray capacitance estimated by the type of the motor 1 of each axis, the length of the power cable 3, or the like, or may be the length of the power cable 3 corresponding to each axis. The data is acquired from, for example, the host device 20 and stored in the storage device 12. However, the acquisition path and the acquisition method of the data indicating the noise amount may be other than the above. For example, a configuration in which the phase controller 10 (processor 11) estimates or measures the stray capacitance and stores the stray capacitance in the storage device 12 may be adopted.

The processor 11 is a central processing unit (CPU) or the like, and performs processing related to phase determination by executing a program stored in the storage device 12. The input/output device 13 is used to exchange information and data with the host device 20 and transmit a timing signal Tm including information related to the determined phase to each of the control units 4. Note that the processing performed by the processor 11 may be performed by an integrated circuit (hardware) such as a field programmable gate array (FPGA) or an application specific integrated circuit (ASIC).

<<Processing in Phase Controller>>

Figure 10:
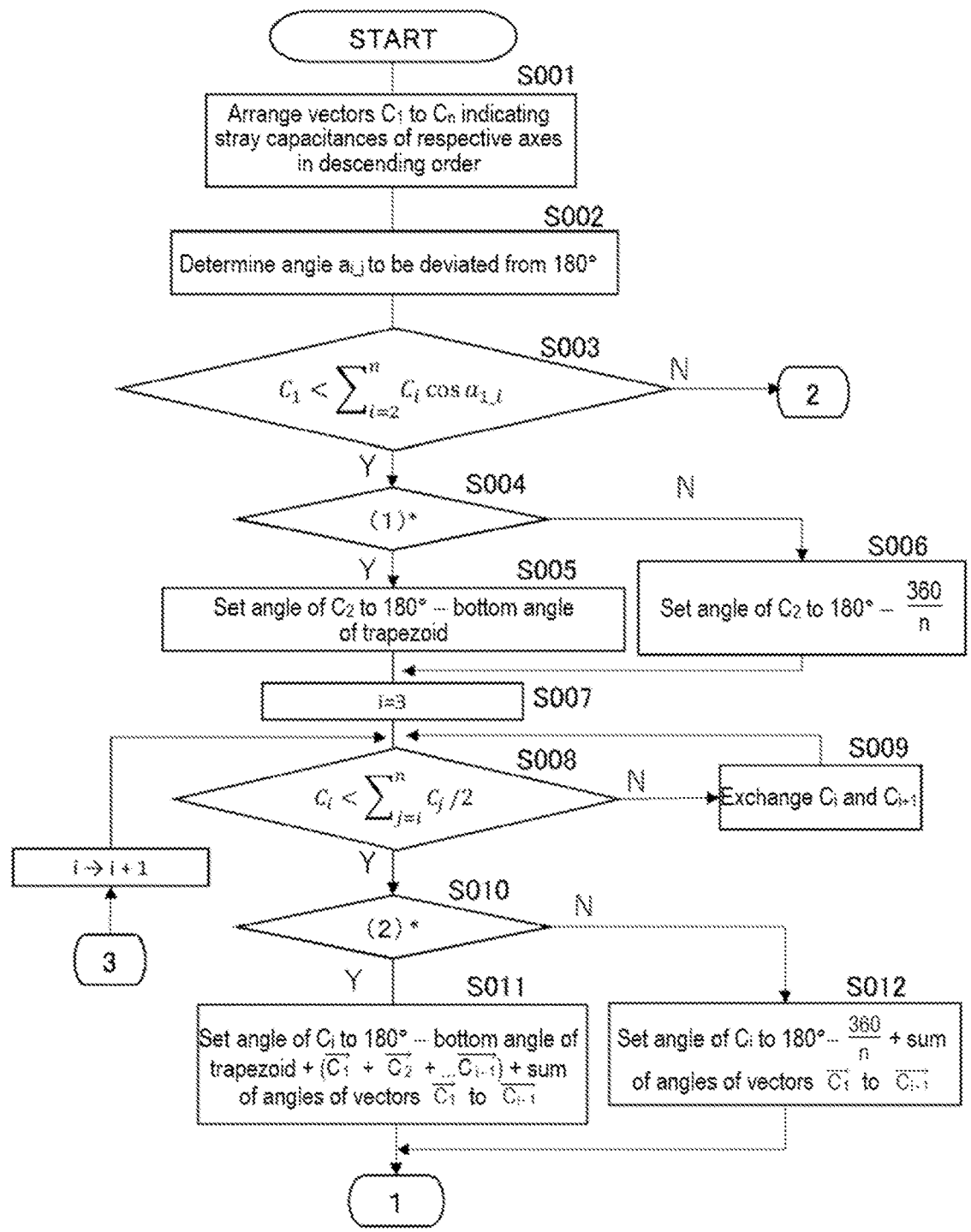
FIG. 10 is a flowchart illustrating a processing example of the phase controller.
Figure 11:
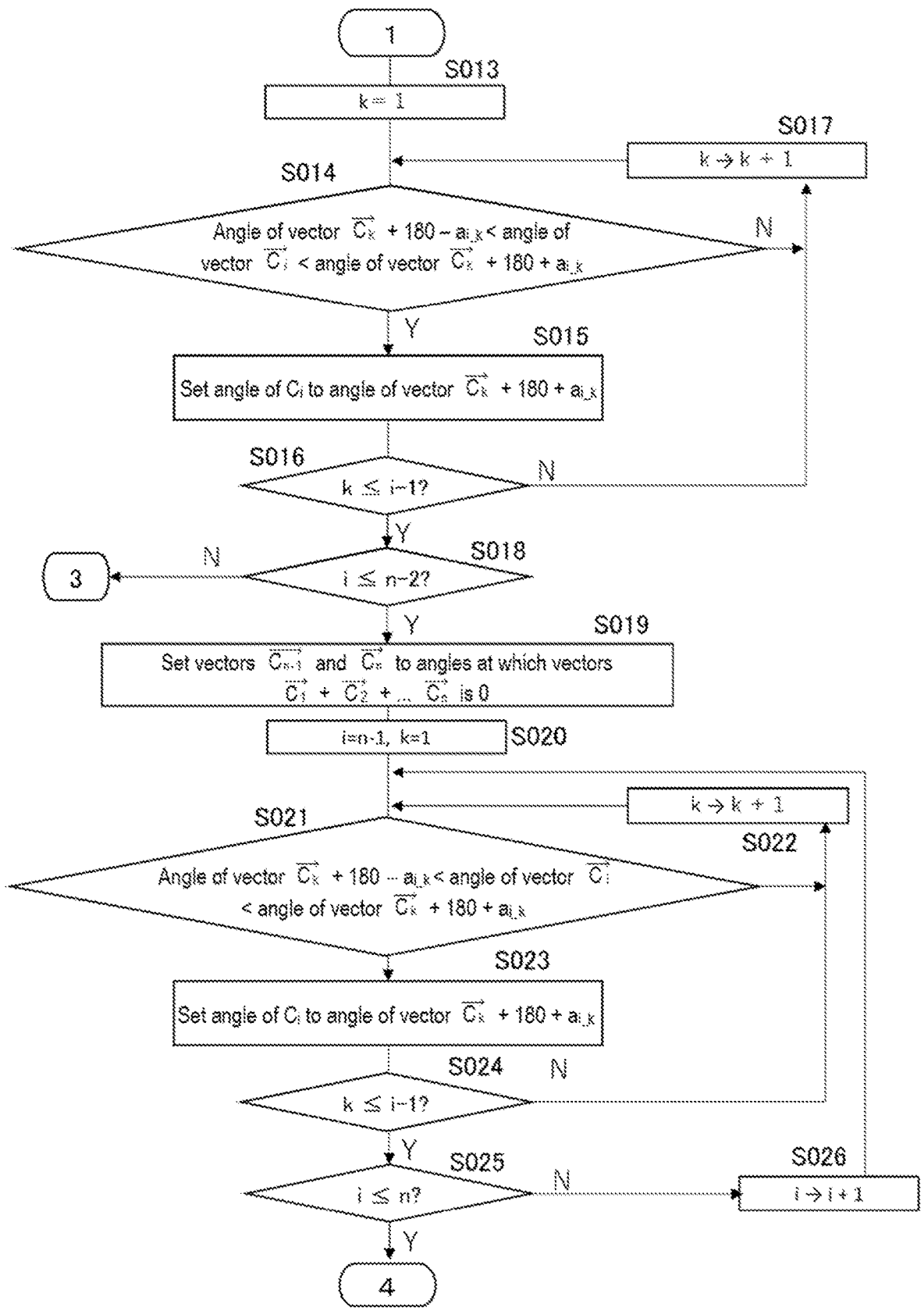
FIG. 11 is a flowchart illustrating a processing example of the phase controller.
Figure 12:
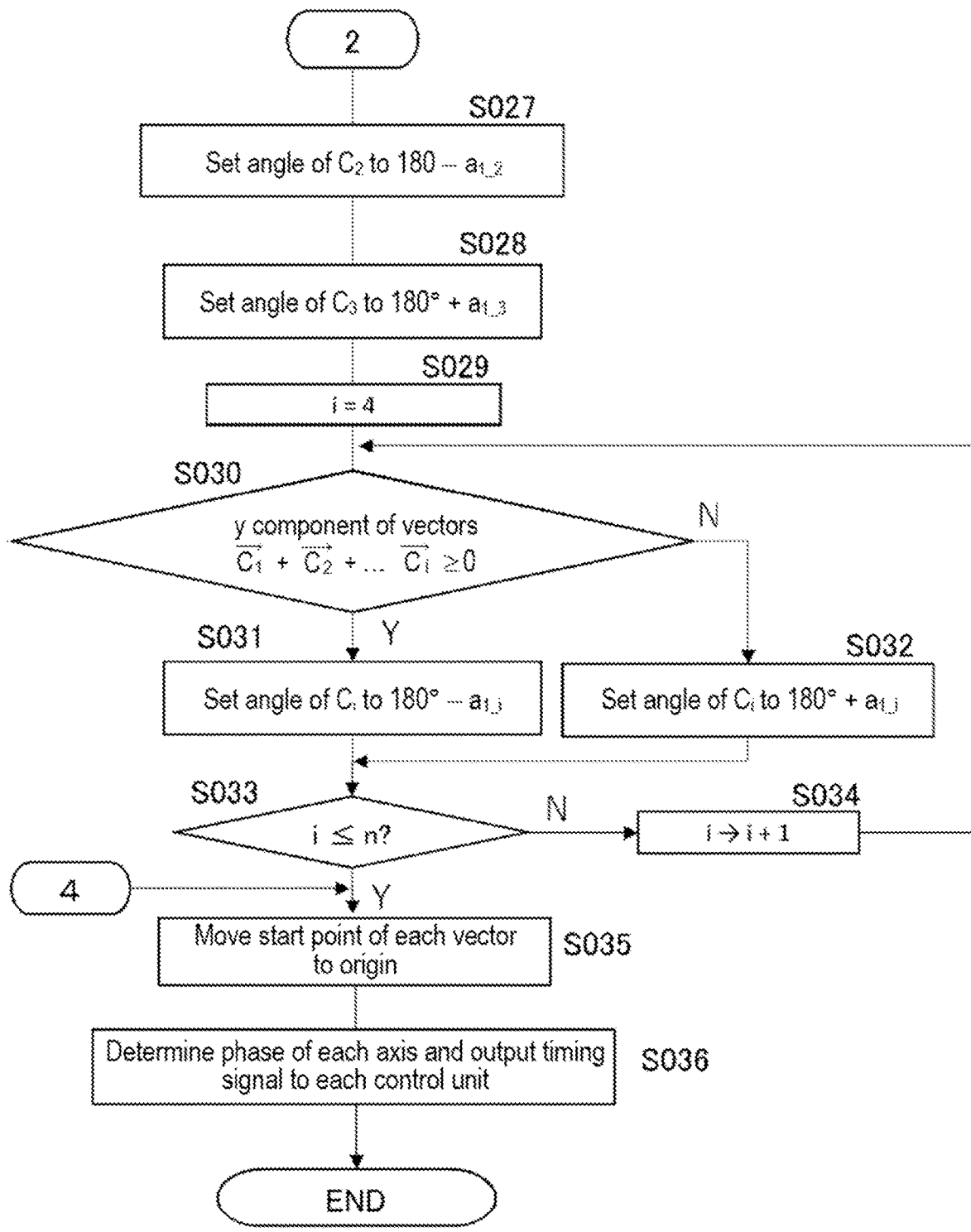
FIG. 12 is a flowchart illustrating a processing example of the phase controller.

FIGS. 10, 11, and 12 are flowcharts illustrating processing examples in the phase controller 10. The processing in FIGS. 10 to 12 is performed by the processor 11. In step S001 of FIG. 10, the processor 11 arranges the vectors $C_1$ to $C_n$ indicating the stray capacitances of the respective axes stored in the storage device 12 in descending order.

In step S002, when the relative angle between two vectors $C_1$ and C; (corresponding to $C_x$ and $C_y$ described above) is 180°, the processor 11 determines an angle $a_{i-j}(c_x+c_y/2C_1)$ to be deviated from 180°. The angle $a_{i-j}$ may be a value stored in advance in the storage device 12, may be acquired from the host device 20, or may be calculated using some kind of algorithm.

In step S003, the processor 11 determines whether or not a polygon can be created with the vector $C_1$ as a bottom side. When it is determined that the polygon can be created, the processing proceeds to step S004, and otherwise, the processing proceeds to step S027 (FIG. 12).

In step S004, the processor 11 determines whether or not the bottom angle of the trapezoid with the vector $C_1$ being the lower bottom, the vector $C_2$ being the oblique side, and the length of the sides excluding the lower bottom being the sum of the vectors $C_2$ to $C_n$ is smaller than 360/n. If it is determined that the bottom angle of the trapezoid is smaller than 360/n, the process proceeds to step S005, and otherwise the process proceeds to step S006.

In step S005, the processor 11 determines the angle of $C_2$ with respect to the vector $C_1$ to be an angle obtained by subtracting the bottom angle of the trapezoid from 180°. In step S006, the processor 11 determines the angle of $C_2$ with respect to the vector $C_1$ to be an angle obtained by subtracting an angle of (360/n) from 180°.

In step S007, the value of i for specifying the vector $C_1$ is set to 3. In step S008, it is determined whether or not the vector $C_1$ is smaller than "(the sum of the remaining vectors $C_1$ to $C_n$)/2". If it is determined that the vector $C_1$ is smaller than "(the sum of the remaining vectors $C_1$ to $C_n$)/2", the process proceeds to step S010, and otherwise, the processor 11 performs exchange between $C_1$ and $C_1+1$ and returns the process to step S008.

In step S010, it is determined whether or not an angle obtained by adding an angle formed by the lower bottom "$C_1+C_2+\ldots C_{i-1}$" and the vector $C_{i-1}$ to a bottom angle of a trapezoid with the sum of vectors "$C_1+C_2+\ldots C_{i-1}$" as a lower bottom, the vector $C_i$ as an oblique side, and the length of sides excluding the lower bottom being a sum of $C_{i-j}$ to $C_n$ is smaller than 360/n. Here, in a case where it is determined that the corresponding angle is smaller than 360/n, the process proceeds to step S011, and otherwise, the process proceeds to step S012.

In a case where the process proceeds to step S011, the processor 11 sets the angle of the vector $C_1$ to a value obtained by an operation of "180°−bottom angle of trapezoid+(sum of vectors "$C_1+C_2+\ldots C_{i-1}$")+(sum of angles of vectors $C_1$ to $C_{i-1}$)". On the other hand, in a case where the process proceeds to step S012, the processor 11 sets the angle of the vector $C_1$ to a value obtained by an operation of "180°−(360/n)+(sum of the angles of the vectors $C_1$ to $C_{i-1}$)".

In step S013, the processor 11 sets the value of k that specifies the vector $C_k$ to 1. In step S014, the processor 11 determines whether or not an angle of the vector $C_1$ belongs to a range larger than the value of "angle of $C_k+180-a_{i\_k}$" and smaller than the value of "angle of $C_k+180+a_{i\_k}$". When it is determined that the angle belongs to the corresponding range, the process proceeds to step S015, and otherwise, the process proceeds to step S017. In step S017, the value of k is incremented, and the process returns to step S014.

In a case where the process proceeds to step S015, the processor 11 sets the angle of Ci to a value of "angle of $C_k+180+a_{i\_k}$". In step S016, the processor 11 determines whether or not the current value of k is i−1 or more. In a case where it is determined that the value of k is i−1 or more, the process proceeds to step S018, and otherwise, the value of k is incremented (S017), and the process returns to step S014.

In step S018, the processor 11 determines whether the current value of i is n−2 or more. In a case where it is determined that the value of i is n−2 or more, the process proceeds to step S019, and otherwise, the value of i is incremented, and the process returns to step S008.

In step S019, the vectors $C_{n-1}$ and $C_n$ are set to angles at which the sum of the vectors $C_1$ to $C_n$ is 0. Thereafter, the processor 11 performs processing similar to that of steps S014 and S015 on the vectors $C_{n-1}$ and $C_n$ (steps S021 to S026). This determines the angles for the remaining vectors. When YES is determined in step S025, the process proceeds to step S035 (FIG. 12).

In a case where the process proceeds to step S027, processing in a case where a polygon cannot be created is performed. In step S027, the processor 11 sets the angle of the vector $C_3$ to an angle calculated by "$180+a_{1\_3}$".

In step S028, the processor 11 sets the angle of the vector $C_2$ to an angle calculated by "$180-a_{1\_2}$". In step S029, the processor 11 sets the value of i for specifying the vector $C_i$ to 4.

In step S030, the processor 11 determines whether or not the y component of the vectors $C_1$ to $C_i$ is 0 or more. If it is determined that the y component is 0 or more, the processor 11 sets the angle of the vector $C_i$ to "$180-a_{1\_i}$" (step S031); otherwise, the processor 11 sets the angle of the vector $C_1$ to "$180+a_{1\_i}$" (step S032).

In step S033, the processor 11 determines whether or not the current value of i is n or more. In a case where it is determined that the current value of i is n or more, the process proceeds to step S035, and otherwise, the value of i is incremented (step S034), and the process returns to step S030.

In step S035, the processor 11 slidingly moves the vectors $C_1$ to $C_n$ so that the start points of the vectors $C_1$ to $C_n$ are located at the origin of the XY coordinates. In step S036, the processor 11 determines (arranges) the phases of the carrier signals corresponding to the respective axes (motors 1-1 to 1-n) from the relative angles of $C_2$ to $C_n$ with reference to the vector $C_1$. Then, the processor 11 outputs a timing signal including information indicating the phase of the carrier signal to each of the control units 4 (step S036).

The processing of the flowchart illustrated in FIGS. 10 to 12 assumes a case where the number N of axes is six, or the like, that is, a case where the number N or n of carrier signals (vectors) is four or more. However, in a case where the number (i) of axes is two or three, it is possible to change the processing according to the flowchart so as not to perform the processing of the vector related to the axis that does not exist by deviating the phases of the carrier signals between the axes by such distributed arrangement of phase.

Effects of Embodiments

According to the motor control device 2 of the embodiment, by deviating the phases of the carrier signals between the axes by the distributed arrangement of phase, it is possible to avoid the superposition of noise and reduce the peak value (amplitude). Furthermore, by uniformly arranging the phases within 360°, when the average of one period of the carrier signal is considered for the noise coming out from each axis, the noise filter 9 can be made difficult to be magnetically saturated by bringing the vector sum close to zero. Note that the noise filter 9 is not necessarily required to be provided.

According to the motor control device 2 of the embodiment, the angle of each vector is determined so that the relative angle between the two vectors is prevented from becoming 180°. As a result, in the configuration including the noise filter 9, it is possible to suppress heat generation of the X capacitor 9*a* and the like due to a large current flowing through the X capacitor 9*a*. In addition, the common mode noise can be reduced without increasing the radiation noise. The configuration of the embodiment of the present invention can be appropriately changed without departing from the object thereof.

<Supplementary Note>

A motor control device (2) including: N inverters (6) configured to control N motors (1-1 to 1-N) connected via power cables (3-1 to 3-N) based on PWM signals, respectively; and
    a phase controller (10) configured to determine phases of N carrier signals to be used for generating PWM signals to be supplied to the N inverters (6) so that a sum of N vectors represented by noise amounts related to the respective N motors (1-1 to 1-N) becomes zero.

DESCRIPTION OF SYMBOLS

1-1-1-*n* . . . motor
2 . . . motor control device (driver)
3-1-3-*n* . . . power cable
4-1-4-*n* . . . motor control unit
5 . . . PWM signal generator
6 . . . inverter
8 . . . power supply
9 . . . noise filter
10 . . . phase controller
41 . . . controller
42 . . . command signal generator
51 . . . carrier signal generator
52 . . . comparator

The invention claimed is:

1. A motor control device, comprising:
N inverters configured to control N motors connected via power cables based on PWM signals, respectively; and
a phase controller configured to determine phases of N carrier signals to be used for generating PWM signals to be supplied to the N inverters so that a sum of N vectors represented by noise amounts related to the respective N motors becomes zero,
wherein the phase controller arranges the N vectors in descending order of absolute values of magnitudes, and in a case where an absolute value of a magnitude of a maximum vector is smaller than ½ of a total value of the absolute values of the magnitudes of the N vectors, creates a polygon including N sides in which the maximum vector is arranged at a bottom side and remaining vectors are arranged as remaining sides, and determines relative angles between the bottom side and the respective remaining sides as phases of the N carrier signals.

2. The motor control device according to claim 1, further comprising a noise filter including an inductor and a capacitor, the noise filter being configured to suppress common mode noise generated between a power supply and a ground of the motor control device.

3. The motor control device according to claim 2, wherein the phase controller determines phases of the N carrier signals so as not to generate a pair of carrier signals having phases different by 180°.

4. The motor control device according to claim 1, wherein in an arrangement of sides other than the bottom side, in a case where a trapezoid in which a sum of vectors forming already arranged sides is set as a lower bottom, a length of an oblique side is equal to any one of remaining unarranged vectors, and a sum of lengths of remaining sides excluding the lower bottom is equal to an absolute value of a magnitude of the remaining unarranged vectors can be created, the phase controller arranges any one of the remaining vectors as one of the oblique sides of the trapezoid so as to be continuous with an end point of the arranged vector arranged last.

5. The motor control device according to claim 4, wherein the phase controller selects, as any one of the remaining unarranged vectors, a vector in which an absolute value of a magnitude of the vector is smaller than ½ of a sum of absolute values of magnitudes of the remaining vectors in descending order of the absolute values of the magnitudes of the vectors.

6. The motor control device according to claim 3, wherein a maximum value of angles of adjacent sides in the polygon including N sides is set to a value of an angle formed by a regular N-polygon.

7. The motor control device according to claim 1, wherein when there are a first vector and a second vector having a relative angle of 180° in the N vectors, the phase controller changes the relative angle to an angle deviated from 180° by an angle obtained by dividing an absolute value of magnitudes of the first vector and the second vector by a value twice as large as the maximum vector.

8. The motor control device according to claim 1, wherein when an absolute value of a magnitude of a maximum vector when the N vectors are arranged in descending order of absolute values of the magnitudes is larger than ½ of a total value of absolute values of the magnitudes of the N vectors, the phase controller sets, for each of the vectors other than the maximum vector, a relative angle between the maximum vector and a vector other than the maximum vector to an angle deviated from 180° by an angle obtained by dividing a sum of the absolute value of the magnitude of the maximum vector and the absolute values of the magnitudes of the vectors other than the maximum vector by a value obtained by multiplying an absolute value of the magnitude of the maximum vector by two times.

9. The motor control device according to claim 1, wherein when a relative angle between two vectors of a vector to be arranged next and the arranged vector falls within a range obtained by increasing or decreasing, from 180°, a first value being a value obtained by dividing a sum of absolute values of magnitudes of the two vectors by two times an absolute value of a magnitude of the maximum vector during creation of the polygon, the phase controller sets the relative angle between the two vectors to an angle deviated from 180° by the first value in a positive direction.

10. A motor control method, comprising:
acquiring, by a motor control device, phases of N carrier signals used for generating PWM signals to be supplied to N inverters that control N motors respectively connected via power cables based on PWM signals, as N vectors represented by noise amounts related to the respective N motors; and
determining, by the motor control device, the phases of the carrier signals so that a sum of the N vectors becomes zero, wherein
the determining includes arranging the N vectors in descending order of absolute values of magnitudes, and in a case where an absolute value of a magnitude of a maximum vector is smaller than ½ of a total value of the absolute values of the magnitudes of the N vectors, creates a polygon including N sides in which the maximum vector is arranged at a bottom side and remaining vectors are arranged as remaining sides, and determines relative angles between the bottom side and the respective remaining sides as phases of the N carrier signals.

11. A non-transitory computer-readable recording medium having stored therein a program that causes a computer to execute:

acquiring phases of N carrier signals used for generating PWM signals to be supplied to N inverters that control N motors respectively connected via power cables based on PWM signals, as N vectors represented by noise amounts related to the respective N motors; and determining the phases of the carrier signals so that a sum of the N vectors becomes zero, wherein the determining includes arranging the N vectors in descending order of absolute values of magnitudes, and in a case where an absolute value of a magnitude of a maximum vector is smaller than ½ of a total value of the absolute values of the magnitudes of the N vectors, creates a polygon including N sides in which the maximum vector is arranged at a bottom side and remaining vectors are arranged as remaining sides, and determines relative angles between the bottom side and the respective remaining sides as phases of the N carrier signals.

* * * * *